United States Patent
Alvarez et al.

(10) Patent No.: US 10,517,317 B2
(45) Date of Patent: *Dec. 31, 2019

(54) ASEPTIC METHOD OF PREPARING FRUIT JUICE AND NON-FRUIT JUICE BEVERAGES TO IMPROVE FLAVOR PROFILES AND RETAIN ORGANOLEPTIC PROPERTIES OF FRUIT JUICE AND NON-FRUIT JUICE BEVERAGES

(71) Applicant: HARMLESS HARVEST, INC., San Francisco, CA (US)

(72) Inventors: Giannella Alvarez, San Francisco, CA (US); Brian Ng, San Francisco, CA (US); David Bauer, Oakland, CA (US); Mathieu Lostie, Bangkok (TH)

(73) Assignee: HARMLESS HARVEST, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/950,663

(22) Filed: Apr. 11, 2018

(65) Prior Publication Data

US 2018/0228184 A1 Aug. 16, 2018

Related U.S. Application Data

(63) Continuation-in-part of application No. 15/449,046, filed on Mar. 3, 2017, now Pat. No. 9,968,122.

(60) Provisional application No. 62/302,992, filed on Mar. 3, 2016, provisional application No. 62/487,619, filed on Apr. 20, 2017.

(51) Int. Cl.
| | |
|---|---|
| *A23L 2/02* | (2006.01) |
| *A23L 2/46* | (2006.01) |
| *A23L 2/74* | (2006.01) |
| *A23F 3/20* | (2006.01) |

(52) U.S. Cl.
CPC ........ *A23L 2/02* (2013.01); *A23F 3/20* (2013.01); *A23L 2/46* (2013.01); *A23L 2/74* (2013.01); *A23V 2002/00* (2013.01); *A23V 2250/21* (2013.01); *A23V 2300/24* (2013.01); *A23V 2300/34* (2013.01); *A23V 2300/38* (2013.01)

(58) Field of Classification Search
CPC ...... A23G 2200/14; A23G 3/346; A23G 1/48; A23G 3/48; A23L 2/02; A23L 2/42; A23L 2/74; A23L 25/30; A23L 2/52; A23V 2002/00; A61L 9/03; B01D 63/15; B01B 61/18

See application file for complete search history.

(56) References Cited

U.S. PATENT DOCUMENTS

| | | | |
|---|---|---|---|
| 3,899,606 A | 8/1975 | Forkner | |
| 9,968,122 B1* | 5/2018 | Bauer | A23L 5/21 |
| 2003/0064140 A1* | 4/2003 | Lineback | A23L 2/02 |
| | | | 426/271 |
| 2009/0011111 A1* | 1/2009 | Sugiura | A23L 2/02 |
| | | | 426/599 |
| 2009/0246342 A1* | 10/2009 | Clark | A23L 2/02 |
| | | | 426/491 |
| 2012/0135124 A1* | 5/2012 | Letourneau | A23L 2/02 |
| | | | 426/599 |
| 2016/0185474 A1 | 6/2016 | Bronner et al. | |
| 2016/0366917 A1* | 12/2016 | Zandhuis | A23L 2/02 |
| 2018/0228184 A1* | 8/2018 | Alvarez | A23L 2/02 |

OTHER PUBLICATIONS

Prades et al., "Coconut water preservation and processing: a review," Fruits, vol. 67(3), pp. 157-171.

* cited by examiner

*Primary Examiner* — Ana M Fortuna

(74) *Attorney, Agent, or Firm* — Hogan Lovells US LLP

(57) ABSTRACT

An aseptic method of preparing high acid and low acid fruit and non-fruit beverages to improve flavor profiles and retain organoleptic properties of the fresh ingredients is provided, as well as the fruit and non-fruit beverages obtained through this process with the benefit of extended shelf-life.

17 Claims, No Drawings

ASEPTIC METHOD OF PREPARING FRUIT JUICE AND NON-FRUIT JUICE BEVERAGES TO IMPROVE FLAVOR PROFILES AND RETAIN ORGANOLEPTIC PROPERTIES OF FRUIT JUICE AND NON-FRUIT JUICE BEVERAGES

RELATED APPLICATIONS

This application is a continuation-in-part of U.S. Ser. No. 15/449,046, filed on Mar. 3, 2017, which claimed priority to U.S. provisional application 62/302,992 filed on Mar. 3, 2016. This application also claims priority to U.S. provisional application 62/487,619, filed on Apr. 20, 2017, the contents of both of which are herein incorporated by reference in their entirety.

BACKGROUND OF THE INVENTION

There is a need for a method of preparing beverages made from fruit and non-fruit ingredients (as well as mixtures of fruit and non-fruit beverages) that sterilizes the beverages and yet maintains their flavor and nutrition. Sterilization methods that use high heat for long periods of time alter the nutritional benefits of fruit and non-fruit beverages and also alter the taste. Other methods of sterilization using filters, and maintaining the beverages at a chilled temperature also negatively alters the taste of the beverage. There thus remains a need for a method to provide a stable and yet safe and sterile fruit and non-fruit beverages that still taste natural and fresh. The invention meets this need.

SUMMARY OF THE INVENTION

The inventions described herein provide a method of preparing fruit and non-fruit beverages that removes *Clostridium botulinum* (*C. botulinum*) spores and retains the flavor of natural unprocessed ingredients. The method comprises heating a liquid beverage (fruit and non-fruit beverages or mixtures thereof) to a temperature of about 50° C. to about 100° C. while filtering through two micro filters in series having a pore size of about 0.2 microns to remove *C. botulinum* spores and retain the natural and fresh flavors. In certain embodiments the liquid beverage is heated to a temperature of about 67-73° C., and in certain embodiments the liquid beverage is heated to a temperature of about 73° C. Preferably the liquid beverage is heated only for about 1 to 2 minutes at these temperatures as this allows the beverage to maintain its flavor and, in combination with the microfiltration, removes the *C. botulinum* spores. The methods of the invention provide an effective microbial removal of pathogenic and non-pathogenic vegetative cells and spores. The effective ultra-filtration sterilization treatment minimizes any risk of spoilage (including that by *C. botulinum*) when loss of bottled beverage refrigeration (and subsequent loss in chilled product temperature) might occur.

The invention also provides fruit and non-fruit beverages or mixtures thereof obtained by the methods of the invention.

The inventors have shown that the process is useful for preparing coconut water. However, the same benefits are achieved when the invention is applied to individual and blends of juices such as from pineapple, apple, passion fruit, lychee, mango, strawberry, guava, peach, pear, mangosteen, lemon, and lime. The same benefits are achieved when the invention is applied to non-fruit juice beverages, which include, but is not limited to, individual and blends of teas and herbal teas made from matcha, Camellia senensis, chamomille, guayusa, spearmint, peppermint, ginger, cocoa, chili, kaffir lime leaves, and basil. In addition, the processes can be used for mixtures of fruit and non-fruit beverages. In certain embodiments, the fruit juice is not coconut water, whereas in certain embodiments, the fruit juice is coconut water or contains coconut water in the mixture (of other fruit juices or teas, for example). In certain embodiments, the fruit juice may be a combination of fruit juices that include coconut water. In certain embodiments, the fruit juice may be a combination of fruit juices that does not include coconut water. In certain embodiments, the non-fruit juice beverages do not include coconut water. In certain embodiments, the non-fruit juice beverages include coconut water.

Coconut water and other fruit and non-fruit beverages obtained by the methods of the invention have the benefit of extended shelf-life of up to 1 year. Methods of the invention, provide the benefit of having fruit and non-fruit beverages that maintain the organoleptic properties of fresh, non-pasteurized, non-processed fruit and non-fruit juice beverages and yet the beverages have an extended shelf life much longer than fresh juice because the process removes microbes. In addition, methods of the invention provide fruit and non-fruit beverages having an extended shelf life much longer than beverages prepared using non-thermal pasteurization processes such as high pressure processing (HPP) and pulsed electric field processing (PEF). Methods of the invention provide a fruit and non-fruit beverage or mixtures thereof that have a longer shelf life than other such beverages prepared using other processes that do not deliver a "commercially sterile" product. The benefit of extended shelf-life applies to high-acid and low-acid beverages.

DETAILED DESCRIPTION OF THE INVENTION

The process begins by preparing a liquid beverage from fruit and non-fruit ingredients by existing, non-novel methods such as juicing fruits or brewing herbs in water. The resulting beverage is chilled to a temperature less than 5° C., preferably about 4° C. The liquid beverage is then pre-filtered using a series of two macro filters to remove large particles such as pulp or herbs. After the particle removal filtration process, the liquid beverage goes through a pre-filtration process and then through a final microfiltration process.

Macro Filtration Process

The macro filtration process utilizes two macro filters; the first filter has pores sized about 10 to 50 microns, preferably about 20 microns. The filtrate from the first macro filtration is then processed through a second macro filter having pores sized about 1 to 5 microns, preferably about 1 micron. The filtrate from the second "macro" filter is then chilled to a temperature of less than 5° C., preferably about 4° C. This filtrate is then processed through a pre-microfiltration process described below.

Pre-Microfiltration Process

In one embodiment, the pre-microfiltration process the liquid beverage that was processed through the macro filtration process described above is heated to a temperature of about 50° C. to 100° C., 67-73° C., or 70-73° C. or more preferably 73° C. and then filtered through a first filter having pores ranging from 0.6-1.0 microns, preferably 0.8 microns. Preferably this first filter is a cross flow/tangential flow filter. The permeate (the liquid beverage that flows through the filter) is then run through a second filter (preferably a bus or "dead end" filter) having pores ranging from 0.4 to about 0.7 microns, preferably 0.45 microns. This filtered liquid beverage is then cooled to less than 5° C., preferably about 4° C. This liquid beverage can be held, if necessary for up to about 10 days before the final microfiltration process, as long as the liquid beverage is kept chilled at a temperature of less than 5° C., preferably about 4° C.

In another embodiment, the pre-microfiltration process that follows the macro filtration process is as follows. The liquid beverage that was processed through the macro filtration described above is heated to a temperature of about 50° C. to 100° C., 67-73° C., or 70-73° C. or more preferably 73° C., and then filtered through a filter having pores ranging from 0.45 to 0.8 microns, preferably 0.5 microns. Preferably this filter is a cross flow/tangential flow filter. This filtered liquid beverage is then cooled to less than 5° C., preferably about 4° C. This liquid beverage can be held, if necessary for up to about 10 days before the final microfiltration process, as long as the liquid beverage is kept chilled at a temperature of less than 5° C., preferably about 4° C.

Final Microfiltration Process

Then the filtered liquid beverage obtained from one of the two above described pre-micro filtration process is processed through a final microfiltration process, which involves filtering the heated liquid beverage so that it is filtered when warmed. The liquid beverage is heated to a temperature of about 50° C. to 100° C., 67-73° C., or 70-73° C. or more preferably 73° C. and then is processed through two cartridge micro filters (preferably bus or "dead end filters"), arranged in series. Heating the liquid beverage to 73° C. provides the added benefit that it reduces the potential for heat resistant microbial growth on the filter surface, and therefore minimizes the risk of filter "grow through." These cartridge micro filters have a pore size of about 0.1 to about 1.0, preferably, 0.2 microns. By processing the liquid beverage through the micro-filters at the temperatures of 50° C. to 100° C., 67-73° C., or 70-73° C. or more preferably 73° C., the liquid beverage flavor remains and is not noticeably altered as is the case if cold filtration is utilized or long heat pasteurization methods are undertaken. The liquid beverage through this microfiltration process is held at the elevated temperatures (50° C. to 100° C., 67-73° C., or 70-73° C. or more preferably 73° C.) for about 1 to 2 minutes. This process removes bacteria, microbes and C. botulinum spores and yet retains the organoleptic properties of freshly prepared, not thermally pasteurized liquid beverage.

After the liquid beverage is processed through the second micro filter, it is cooled to about a temperature of about 20-30° C., preferably 30° C. The liquid beverage is packaged into sterile bottles using aseptic filing and packaging lines, thereby ensuring that no C. botulinum spores are reintroduced.

Coconut water and other fruit and non-fruit beverages obtained by the methods of the invention have the benefit of extended shelf-life of up to 1 year. Methods of the invention, provides the benefit of having fruit and non-fruit beverages that maintain the organoleptic properties of fresh, non-pasteurized, non-processed fruit and non-fruit juice beverages and yet the beverages have an extended shelf life much longer than fresh juice because the process completely removes microbes, yielding a commercially sterile product. In addition, methods of the invention provide fruit and non-fruit beverages having an extended shelf life much longer than beverages prepared using non-thermal pasteurization processes such as high pressure processing (HPP) and pulsed electric field processing (PEF). HPP most commonly refers to High Pressure Processing and is a method of preserving food and beverage, in which a product is processed under very high pressure, leading to the inactivation of certain microorganisms and enzymes in the food. HPP, however, does not inactivate microbial spores nor is it able to produce a commercially sterile food or beverage. Shelf life is usually up to 60 days for low-acid fruit and non-fruit beverages and up to 75 days for high-acid fruit and non-fruit beverages, depending on the product composition. PEF involves pulsing a liquid with an electric field to inactivate microbes but this also does not produce a sterile product. In contrast, with method of the invention utilizing microfiltration through 0.2 micron filters, one can produce a commercially sterile beverage which gives it the advantage of a longer shelf life when paired with aseptic filling and packaging methods.

Methods of the invention provide a fruit and non-fruit beverage that has a longer shelf life than other such beverages prepared using other processes that do not deliver a "commercially sterile" product.

EXAMPLES

End Product Evaluation

End Product Evaluation was conducted on three separate runs of minimum 3,000 units each. Filter-sterilized coconut water prepared by methods described herein was produced as a sterile fill of 480 ml into the 500-ml common round bottle. Results from these tests are reported in the Table below. Tests 1, 2, and 3 had respective numbers of 480-ml coconut water units of 3,864, 3,864, and 3,984 bottles each. All units were commercially sterile in Tests 1 and 3. Mold was recovered from one bottle in Test 2. A valve in the system was inadvertently left open during the test, possibly affecting the test. Taken together, a defect level of one out of 11,712 units was achieved. This defect level is acceptable for end-product evaluation testing conducted using the procedure described. The process, as measured with coconut water filter-processed under methods described herein, thus rendered the coconut water commercially sterile.

| | Results of Microbiological End-Product-Evaluation Tests | | |
|---|---|---|---|
| Test Number | Result (Unsterile/Total) | pH | Streak (PCA Agar) |
| 1 | 0/3,864 | 1500/1500 Normal | 100/100 Negative |
| 2 | 1/3,864 | 1500/1500 Normal | 100/100 Negative |
| 3 | 0/3,984 | 1500/1500 Normal | 100/100 Negative |

The invention claimed is:

1. A method of preparing fruit or non-fruit beverages or mixtures thereof that removes C. botulinum spores and retains the flavor of natural unprocessed ingredients, the method comprising heating the fruit or non-fruit beverages or mixtures thereof to a temperature of 63° C. to about 73° C. for about 1 to 2 minutes while filtering through two micro filters in series having a pore size of about 0.2 microns to remove C. botulinum spores and retain fresh flavor in the fruit or non-fruit beverages or mixtures thereof.

2. The method of claim 1 wherein the fruit or non-fruit beverages or mixtures thereof are heated to a temperature of about 73° C.

3. The method of claim 1 further comprising aseptically packaging the filtered fruit or non-fruit beverages or mixtures thereof into sterile containers.

4. The method of claim 1 wherein before heating the fruit or non-fruit beverages or mixtures thereof to a temperature of 63° C. to about 73° C. while filtering through two micro filters in series, the liquid beverages are subjected to a pre-micro filtration process comprising:

filtering the fruit or non-fruit beverages or mixtures thereof through a first pre-micro filter having pores ranging from 0.6 to 2.0 microns to obtain a permeate;

filtering the permeate through a second pre-micro filter having pores ranging from 0.4 to about 0.7 microns; and cooling the permeate to less than 5° C.

5. The method of claim 4 wherein before the pre-micro-filtration process, the fruit or non-fruit beverages or mixtures thereof are subjected to a macro filtration process, the macro filtration process comprising:

filtering the fruit or non-fruit beverages or mixtures thereof prepared from fresh ingredients through a first macro filter having pores sized about 10 to 50 microns to obtain a first macro liquid beverage filtrate;

filtering the first macro liquid beverage filtrate through a second macro filter having pores sized about 1 to 5 microns to obtain a second macro liquid beverage filtrate; and chilling the second macro liquid beverage filtrate to a temperature of less than 5° C.

6. The method of claim 5 wherein the fruit and non-fruit beverages or mixtures thereof do not include coconut water.

7. The method of claim 4 wherein the fruit and non-fruit beverages or mixtures thereof do not include coconut water.

8. The method of claim 1 wherein before heating the fruit or non-fruit beverages or mixtures thereof to a temperature of 63° C. to about 73° C. while filtering through two micro filters in series, the fruit or non-fruit beverages or mixtures thereof are subjected to a pre-micro filtration process comprising:

filtering the fruit or non-fruit beverages or mixtures thereof through a pre-micro filter having pores ranging from 0.45 to 0.8 microns; and cooling the fruit or non-fruit beverages or mixtures thereof to less than 5° C.

9. The method of claim 8 wherein before the pre-micro-filtration process, the fruit or non-fruit beverages or mixtures thereof are subjected to a macro filtration process, the macro filtration process comprising:

filtering the fruit or non-fruit beverages or mixtures thereof obtained from fresh ingredients through a first macro filter having pores sized about 10 to 50 microns to obtain a first macro liquid beverage filtrate;

filtering the first macro liquid beverage filtrate through a second macro filter having pores sized about 1 to 5 microns to obtain a second macro liquid beverage filtrate; and chilling the second macro liquid beverage filtrate to a temperature of less than 5° C.

10. The method of claim 9 wherein the fruit and non-fruit beverages or mixtures thereof do not include coconut water.

11. The method of claim 8 wherein the fruit and non-fruit beverages or mixtures thereof do not include coconut water.

12. Fruit or non-fruit beverages or mixtures thereof obtained by the method of claim 1.

13. The method of claim 1 wherein the non-fruit beverages are tea drinks.

14. The method of claim 1 wherein the process provides the fruit and non-fruit beverages an extended shelf life as compared to fresh, unprocessed fruit and non-fruit beverages.

15. The method of claim 1 wherein the process provides the fruit and non-fruit beverages an extended shelf life as compared to fruit and non-fruit beverages processed with non-thermal pasteurization processes.

16. The method of claim 1 wherein the process provides the fruit and non-fruit beverages an extended shelf life as compared to fruit and non-fruit beverages processed using processes that do not deliver a commercially sterile product.

17. The method of claim 1 wherein the fruit and non-fruit beverages or mixtures thereof do not include coconut water.

\* \* \* \* \*